United States Patent Office 3,019,712
Patented Feb. 6, 1962

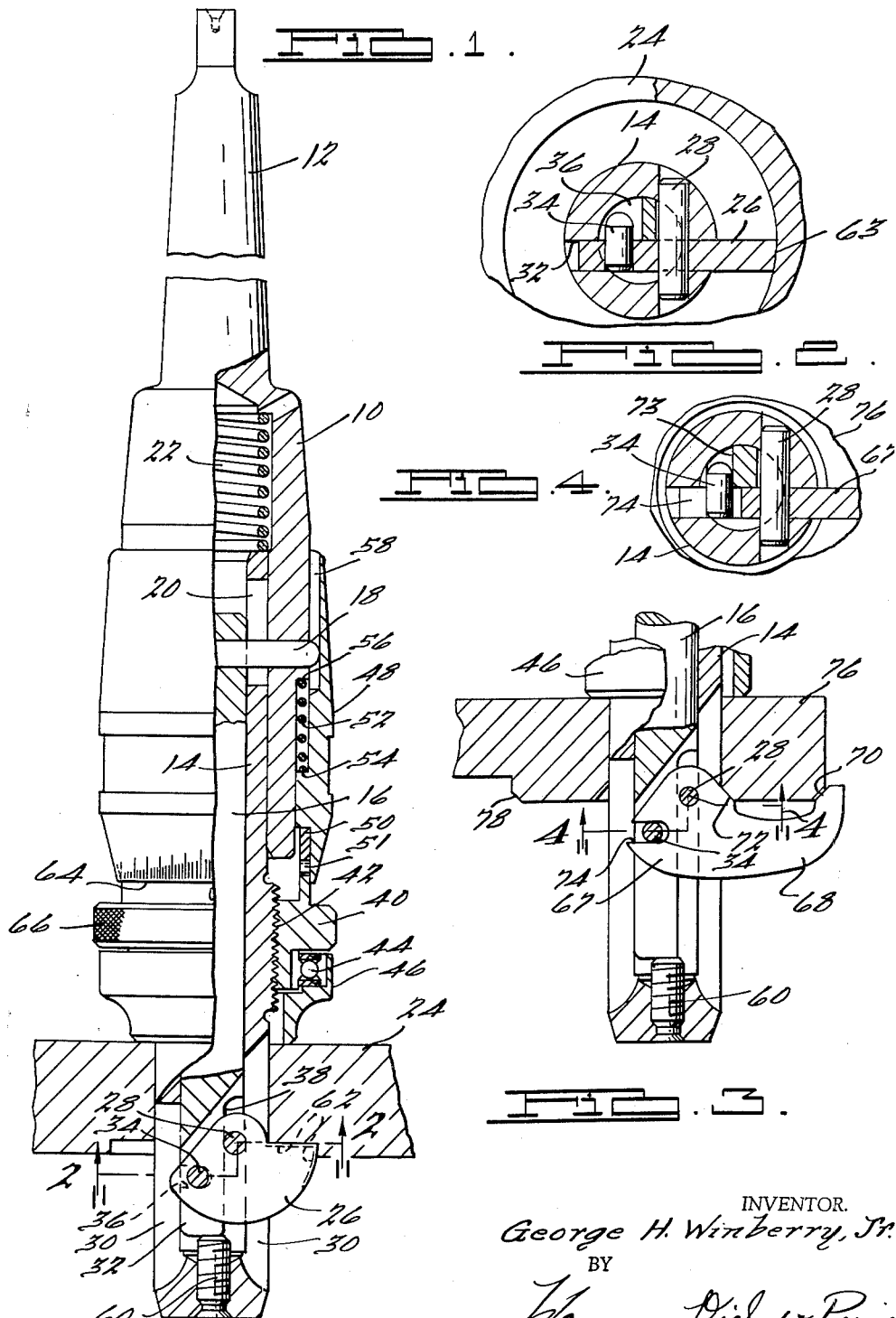

3,019,712
CUTTING TOOL
George H. Winberry, Jr., Detroit, Mich., assignor to Cogsdill Tool Products, Inc., Oak Park, Mich., a corporation of Michigan
Filed Jan. 31, 1958, Ser. No. 712,461
8 Claims. (Cl. 90—11)

The present invention relates to cutting tools and more particularly to a cutting tool having a pivotally mounted cutting blade adapted to be projected through the bore of a workpiece for machining the lower face of the workpiece.

It is one object of the invention to provide a cutting tool having a pivotally mounted cutting blade.

It is another object of the invention to provide a cutting tool having a pivotally mounted cutting blade adapted to be projected through the bore of a workpiece and pivoted into cutting engagement with the lower face of the workpiece.

It is a further object of the invention to provide a cutting tool having a pivotally mounted cutting blade adapted to be positively cammed into and out of cutting engagement with the workpiece.

It is a still further object of the invention to provide a cutting tool having a pivotally mounted cutting blade adapted to be projected through the bore of a workpiece and positively pivoted to a position wherein the cutting blade is disposed substantially perpendicular to the axis of rotation of the cutting tool.

It is a still further object of the present invention to provide a cutting tool having a pivotally mounted cutting blade adapted to be projected through the bore of a workpiece having a cylindrical bottom surface and positively pivoted into cutting engagement so as to chamfer both the lower end of the bore and the radially outward periphery of the cylindrical bottom surface of the workpiece.

Other objects and features of novelty of the invention will be specifically pointed out or otherwise become apparent when referring, for a better understanding of the invention, to the following description taken in conjunction with the accompanying drawing, wherein:

FIGURE 1 is a broken elevational view of a cutting tool embodying features of the invention;

FIG. 2 is a sectional view of the structure illustrated in FIG. 1, taken along the line 2—2 thereof;

FIG. 3 is a broken elevational view of the lower end of the cutting tool of FIG. 1 illustrating another form of the invention; and FIG. 4 is a sectional view of the structure illustrated in FIG. 3, taken along the line 4—4 thereof.

One embodiment of the cutting tool of the present invention is comprised of a shank 10 having upper end 12 thereof adapted to fit within a driving arbor and a sleeve 14 slidably disposed within the lower end thereof.

An elongated camming member 16 is slidably disposed within the sleeve 14 and is keyed to the shank 10 by a pin 18 which passes through a longitudinally extending slot 20 in the upper end of the sleeve 14. A heavy-duty spring 22 is disposed between the upper end of the sleeve 14 and the shank 10 to normally urge the sleeve downwardly so that the upper end of the slot 20 engages the pin 18. (The cutting tool as illustrated in FIG. 1 is in the cutting position as will be described in greater detail hereinafter.)

The lower end of the sleeve 14 is adapted to be disposed within the bore of a workpiece 24, and a cutting blade 26 is pivotally mounted within the lower end of the sleeve by a pin 28. The lower end of the sleeve 14 is appropriately slotted as at 30 and the cutting blade 26 is aligned with the slots so that it may pivot therethrough.

As most clearly illustrated in FIGS. 1 and 2, the lower end of the camming member 16 has a slot 32 therein to receive the cutting blade 26 and a pin 34 is disposed within a suitable aperture in the cutting blade 26 and projects within a horizontally extending slot 36 in the camming member. The lower end of the camming member 16 is also cut away as at 38 to enable the camming member to be longitudinally reciprocated relative to the pin 28. By this construction, the longitudinal reciprocation of the camming member, as will be described in greater detail hereinafter, pivots the cutting blade 26 from a position entirely within the lower end of the sleeve 14 to the cutting position illustrated in FIG. 1.

An adjustable collar 40 is screwed onto a threaded portion 42 of the sleeve 14 and a roller bearing 44 is press fit on the lower end of the adjustable collar 40 with a rotary stop collar 46 press fit on the roller bearing 44. A tubular body 48 is slidably disposed over the lower end of the shank 10 and has an internal ring 50 secured within the lower end thereof. The lower end of the ring 50 has a plurality of teeth 51 thereon which mesh with similar teeth on the upper end of the adjustable collar 40 to prevent rotation thereof as will be described in greater detail hereinafter. A light-duty spring 52 is disposed between an internal shoulder 54 of the tubular body and a shoulder 56 of the shank 10 to normally urge the tubular body downwardly into engagement with the upper end of the adjustable collar 40. It will be observed that the pin 18 projects into a longitudinally extending slot 58 in the upper end of the tubular body 48 to key the body for rotation with the shank 10 but to permit limited longitudinal movement relative to the shank.

In operation, the cutting tool is in its starting position wherein the upper end of the slot 20 in the sleeve 14 is urged against the pin 18 by the heavy-duty spring 22. The driving arbor (not shown) advances and rotates the cutting tool downwardly until the rotary stop collar 46 abuts against the workpiece 24, as illustrated in FIG. 1, to position the cutting blade relative to the workpiece. Because of the roller bearing 44 the rotary stop collar 46 can remain stationary relative to the workpiece 24 while the remainder of the cutting tool rotates relative to the workpiece.

Further downward movement of the driving arbor advances the shank 10 and camming member 16 relative to the sleeve 14 by compressing the heavy-duty spring 22 and the light-duty spring 52. Because of the pin and slot connection between the cutting blade 26 and camming member 16, advancement of the camming member relative to the sleeve pivots the cutting blade about the pin 28 into cutting engagement with the workpiece 24, as illustrated in FIG. 1. It will be observed that the horizontally disposed slot 36 compensates for the lateral movement of the pin 34 as it pivots about the pin 28, and that the cut-away portion 38 of the camming member permits the camming member to advance relative to the pin 28. A setscrew 60 may be screwed into the lower end of the sleeve 14 to adjustably limit the downward movement of the camming member 16 which in turn controls the depth of cut of the cutting blade 26.

When the cut is completed, the sleeve 14 will remain stationary relative to the workpiece during the initial upward movement of the driving arbor to permit the cutting blade 26 to be pivoted to a position entirely within the lower end of the sleeve before the sleeve retracts. The camming member 16 will move upwardly with the initial upward movement of the driving arbor since it is keyed to the shank 10 by the pin 18. When the pin 18 contacts the upper end of the slot 20, the cutting blade will have been pivoted entirely within the sleeve 14 and further upward movement of the driving arbor will withdraw the sleeve and cutting blade from the bore of the workpiece.

It will be observed that the pin and slot connection between the camming member and the cutting blade provides a construction for positively pivoting the cutting blade both into and out of cutting engagement. It will be further observed that the cutting blade is relieved along edges 62 and 63 to permit it to cut properly when rotating in a counterclockwise direction as viewed in FIG. 2.

To compensate for varying thicknesses of different workpieces, the longitudinal position of the adjustable collar 40 relative to the sleeve 14 may be changed by rotating the adjustable collar on the threaded portion 42. This alters the point at which the rotary stop collar 46 will contact the upper face of the workpiece 24 to control the position of the cutting blade 26 relative to the lower face of the workpiece 24.

To permit the rotation of the adjustable collar 40, the tubular body 48 is lifted upwardly against the action of the light-duty spring 52 so that the teeth 51 are disengaged. After the adjustable collar has been rotated the desired amount, the light-duty spring is permitted to urge the tubular body 48 downwardly so that the teeth re-engage to lock the adjustable collar against rotation. An appropriate scale 64 is provided about the circumference of the lower end of the tubular body which cooperates with a suitable line on the adjustable collar to indicate the position of the adjustable collar relative to the tubular body.

The number of teeth 51 may be correlated with the pitch of the threaded portion 42 so that rotation of the adjustable collar one tooth will longitudinally advance or retract the adjustable collar a predetermined distance. For example, if the threaded portion 42 has a pitch of twenty and fifty teeth 51 are provided, rotation of the adjustable collar one tooth will advance or retract the collar one-thousandth of an inch. To facilitate the rotation of the adjustable collar 40, the outer surface thereof may be knurled as at 66.

Referring to FIGS. 3 and 4, a modification is illustrated wherein the cutting blade 67 has an elongated end portion 68 with an angled cutting edge 70 on the end thereof and a second angled cutting edge 72 disposed radially inwardly of the cutting edge 70. The cutting blade is adapted to be pivoted in a similar manner as the cutting blade 26 of FIG. 1 with the exception that the pin 34 is supported within an aperture 73 in the camming member 16 and projects within a horizontally disposed slot 74 in the cutting blade 67, as contrasted to the structure of FIG. 1, wherein the horizontal slot was formed in the camming member 16.

When the cutting blade is pivoted as previously described, the angled cutting edges 70 and 72 are pivoted into cutting engagement with the lower end of the bore of a workpiece 76 and the circular periphery 78 of the workpiece to chamfer both the bore and the circular periphery in one operation. After the cut is completed the cutting blade 67 is retracted to a position entirely within the sleeve 14 and the sleeve is withdrawn from the bore of the workpiece as previously described.

Although the above-described embodiments of the invention illustrate the cutting blade as performing a countersinking and double chamfering operation respectively, it is to be specifically understood that other cutting blades could be designed for performing a variety of cutting operations on the lower face of a workpiece at a spaced distance from a bore therethrough and still fall within the scope of the present invention.

What is claimed is:

1. In a cutting tool for machining the lower face of a workpiece having a bore therein, a sleeve extending from said cutting tool, the lower portion thereof adapted to be disposed within said bore, said lower portion having aligned slots formed in the wall thereof which define a plane passing through the central opening of said sleeve substantially parallel to the axis thereof, a cutting blade pivotally mounted within said portion of the sleeve by a pin passing through the cutting blade and the sleeve in alignment with said slots substantially perpendicular to the axis of the sleeve, an elongated camming member slidably disposed within said sleeve and having a first cut away portion in the lower end thereof disposed in a plane substantially parallel and adjacent to the plane in which the cutting blade pivots, and a second cut away portion in the lower end thereof disposed in a plane substantially perpendicular to the plane in which the cutter blade pivots to permit said lower end of the camming member to extend beyond and move axially relative to said pin, said first portion and said cutter blade being drivingly connected by a pin and slot connection, an adjustable stop pin in the lower end of said sleeve axially aligned with said lower end of the camming member to limit the downward movement of said camming member, whereby the pivotal movement of said cutting blade is limited, and means for axially advancing said camming member relative to said sleeve to positively pivot the cutting blade from a position entirely within the sleeve into a cutting engagement with a point on the lower face of the workpiece spaced from said bore, said pin and slot connection being located such that said means axially advances said pin and slot connection between positions above and below the pin pivotally connecting the cutting blade to the sleeve.

2. In a cutting tool, a hollow body of a diameter which permits it to extend through a bore of a workpiece having a bottom face to be machined, said hollow body having a slot through its wall near the remote end thereof, a cutting blade within said slot having an aperture, a pin extending through the hollow interior of said body for pivotally supporting the blade, a rod slidably disposed within said body and provided with a recess for clearing said pin when moved therein, a pin on said rod offset from the center thereof and disposed within a slot in the cutting blade, and means for advancing said rod for moving the pin in said slot from a position above the pivot point of the cutting blade and to the rear thereof to a position below the pivot point for positively moving the cutting edge into a substantially horizontal position.

3. In a cutting tool, a hollow body of a diameter which permits it to extend through a bore of a workpiece having a bottom face to be machined, said hollow body having a slot through its wall near the remote end thereof, a cutting blade within said slot having an aperture, a pin extending through the hollow interior of said body for pivotally supporting the blade, a rod slidably disposed within said body and provided with a recess for clearing said pin when moved therein, a pin on said rod off-set from the center thereof and disposed within a slot in the cutting blade, and means for advancing said rod for moving the pin in said slot from a position above the pivot point of the cutting blade and to the rear thereof to a position below the pivot point for positively moving the cutting edge into a substantially horizontal position, the bottom of said body having an adjustable screw in the path of movement of said rod for limiting its advancement.

4. In a cutting tool having a hollow body which may be advanced through a bore of a workpiece having a bottom face to be machined, said body having a slot through the wall adjacent to the bottom thereof, a cutting blade within said slot having a cutting edge, a pivot pin extending into the hollow interior of said body and through an aperture in said cutting blade for supporting the cutting blade for pivotal movement outwardly of the slot, a rod within said hollow body having a slot for clearing said pivot pin and a second slot at right angles to the first slot for receiving said blade, an actuating pin on said rod engaging a slot in the blade on the side of said first pin opposite to that containing said cutting edge, and means for advancing said rod within the hollow interior of the body for moving the actuating pin and blade slot from a position above the pivot pin to a position therebelow for positively swinging the blade outwardly and upwardly of the slot into engagement with the workpiece.

5. In a cutting tool having a hollow body which may be advanced through a bore of a workpiece having a bottom face to be machined, said body having a slot through the wall adjacent to the bottom thereof, a cutting blade within said slot having a cutting edge, a pivot pin extending into the hollow interior of said body and through an aperture in said cutting blade for supporting the cutting blade for pivotal movement outwardly of the slot, a rod within said hollow body having a slot for clearing said pivot pin and a second slot at right angles to the first slot for receiving said blade, an actuating pin on said rod engaging a slot in the blade on the side of said first pin opposite to that containing said cutting edge, means for advancing said rod within the hollow interior of the body for moving the actuating pin and blade slot from a position above the pivot pin to a position therebelow for positively swinging the blade outwardly and upwardly of the slot into engagement with the workpiece, and a setscrew in the bottom of the body disposed substantially on the center line thereof in the path of movement of the rod for controlling the advanced position thereof.

6. In a cutting tool having a hollow body which may be advanced through a bore of a workpiece having a bottom face to be machined, said body having a slot through the wall adjacent to the bottom thereof, a cutting blade within said slot having a cutting edge, a pivot pin extending into the hollow interior of said body and through an aperture in said cutting blade for supporting the cutting blade for pivotal movement outwardly of the slot, a rod within said hollow body having a slot for clearing said pivot pin and a second slot at right angles to the first slot for receiving said blade, an actuating pin on said rod engaging a slot in the blade on the side of said first pin opposite to that containing said cutting edge, and means for advancing said rod within the hollow interior of the body for moving the actuating pin and blade slot from a position above the pivot pin to a position therebelow for positively swinging the blade outwardly and upwardly of the slot into engagement with the workpiece, the center of the right angle slot in said rod for receiving said blade being offset from the center of the rod.

7. A cutting blade having a relatively flat body containing an aperture about which it pivots located substantially in alignment with a cutting portion thereof, and a slot in said body parallel to said cutting portion and below said aperture and on the side thereof opposite to that containing said cutting portion.

8. A cutting blade having a relatively flat body containing an aperture about which it pivots located substantially in alignment with a cutting portion thereof, and a slot in said body parallel to said cutting portion and below said aperture and on the side thereof opposite to that containing said cutting portion, said cutting portion having a recess between the ends thereof to provide spaced cutting sections.

References Cited in the file of this patent
UNITED STATES PATENTS

| | | | |
|---|---|---|---|
| 963,725 | Sellers | July 5, | 1910 |
| 1,530,593 | Calkins | Mar. 24, | 1925 |
| 2,082,461 | Pardieck | June 1, | 1937 |
| 2,365,549 | Haynes | Dec. 19, | 1944 |
| 2,404,027 | Belanger | July 16, | 1946 |
| 2,521,947 | Reeves | Sept. 12, | 1950 |
| 2,716,360 | Cogsdill et al. | Aug. 30, | 1955 |
| 2,822,150 | Muse et al. | Feb. 4, | 1958 |